United States Patent [19]
Adams et al.

[11] Patent Number: 5,238,328
[45] Date of Patent: Aug. 24, 1993

[54] SYSTEM FOR COEXTRUDED INNERDUCT WITH FILLED OUTER LAYER

[76] Inventors: Robert M. Adams, 5248 Hearst Ave., Metairie, La. 70001; Andrew J. Cousin, 5333 Canary Ansas Dr., Kenner, La. 70065

[21] Appl. No.: 824,071
[22] Filed: Jan. 23, 1992
[51] Int. Cl.$^5$ .............................................. F16L 1/00
[52] U.S. Cl. .................................... 405/154; 138/141; 174/68.3; 405/15
[58] Field of Search ................. 405/154, 156, 184; 264/173, 174, 300, 269, 270; 138/111, 141, 137; 174/68.3

[56] References Cited

U.S. PATENT DOCUMENTS

| | | | |
|---|---|---|---|
| 4,289,716 | 9/1981 | Voigt | 264/173 X |
| 4,299,256 | 11/1981 | Bacehowski et al. | 264/173 X |
| 4,410,476 | 10/1983 | Redding et al. | 264/173 |
| 4,688,890 | 8/1987 | DeMeo et al. | 174/68.3 X |
| 4,806,289 | 2/1989 | Laursen et al. | 264/173 X |
| 4,892,442 | 1/1990 | Shoffner | 405/154 |
| 5,027,864 | 7/1991 | Conti et al. | 138/177 |
| 5,087,153 | 2/1992 | Washburn | 405/156 X |

FOREIGN PATENT DOCUMENTS 3529541 2/1987 Fed. Rep. of Germany ..... 174/68.3

Primary Examiner—Dennis L. Taylor
Attorney, Agent, or Firm—Pravel, Hewitt, Kimball & Krieger

[57] ABSTRACT

A coextruded innerduct which would include an outer layer of polyethylene, impregnated or filled with a filler material, such as calcium carbonate, talc, microglass beads or strands, or any material which would reduce the contraction and expansion properties of the polyethylene innerduct in relation to the properties of the outer casing, and an inner layer of unfilled polyethylene innerduct which would provide for a smooth surface, to lower the coefficient of friction between itself and the fiber optic cables being pulled therethrough. There is further provided a lubricity agent added to the inner layer, and the innerduct is positioned as part of a multicell system when installed for use.

17 Claims, 2 Drawing Sheets

SYSTEM FOR COEXTRUDED INNERDUCT WITH FILLED OUTER LAYER

BACKGROUND OF THE INVENTION

1. Field Of The Invention

The present invention relates to innerducts utilized in the communications industry for the passage of fiber optic cables therethrough. More particularly, the present invention relates to a coextruded innerduct, having a filled outer layer so that a substantially rigid length of innerduct can be positioned within an outer casing of dissimilar material.

2. General Background

In the communications industry, the use of fiber optic cables, as a transmission means for telephone lines, has become quite common, in both underground or overhead installation. The fiber optic cables which are quite small in diameter, are usually housed within an innerduct of PVC material, which in turn would be positioned within an outer casing of PVC so that the fiber optic cables are protected from the elements when installed underground or over bridge crossings or the like.

At present there are two principal systems for installing fiber optic cables. The first system would be entitled the use of reeled innerduct, and the second system would involve the use of a multi-cell system. Both systems, however, have suffered from the problem of the friction which occurs between the inner wall of the innerduct and the outer wall of the fiber optic cable as the cable is being fed through the innerduct. Often times the innerduct is laid in lengths of thousands of feet, and the fiber optic cable, because of it being a continuous type cable, must be fed or blown through the innerduct in order to complete the installation. However, because of the friction which is involved between the walls of the innerduct and the fiber optic cable over such a distance, this is a difficult thing to achieve at times.

In order to solve the problem of reducing the friction between the innerduct and the fiber optic cable, in the art, there have been introduced the use of lubricating materials such as glycol or other water soluble polymeric lubricants incorporated into the interior wall of the innerduct itself so as to reduce the factor of friction as the cables are moved through the innerduct into position.

There has been granted a patent in the art, Shoffner U.S. Pat. No. 4,892,442, entitled "Prelubricated Innerduct" and assigned to Dura-line, Inc., which discloses an innerduct which is formed by coextruding an outer jacket of high tensile strength polymer and an inner barrier layer of highly lubricous polymer. The intent is to provide an innerduct which has an inner layer impregnated with lubricous material so that in the event there is wear of the tube's inner walls during cable placement, the wear will only expose further lubricants and not increase friction between the respective elements during the duct or cable replacement operation.

The inner core of the material impregnated with the lubricous agent lowers the coefficient of friction to other objects such as the fiber optic cables being pulled through the innerduct. The outer jacket is formed of high tensile strength polymers with a high molecular weight, such as high density polyethylene, so that the innerduct may be formed or wrapped about a spool or the like for subsequent transport. The reeled or rolled innerduct, as it is commonly referred to in the art, would then be continually fed from the roll into placement prior to the running of the fiber optic cable therethrough. This patent, therefore, apparently sought to solve the problems of a) providing a lubricated surface by co-extruding a lubricous agent to lower the coefficient of friction between the surface and the fiber optic cable being threaded therethrough, and b) to provide a high tensile strength exterior layer which would allow the innerduct to be formed around a spool so that it could be placed at the location directly from the spool.

Other problems which the '442 patent did not address are problems confronted in the use of this type of innerduct in straightway, as part of a multi-cell application. For example, in the area of laying fiber optic cables, the alternative to the use of the uninterrupted pathway of rolled innerduct, is through the use a multi-cell system which would comprise, in general, a plurality of lengths of innerduct which would be interconnected via a coupling body, such as the coupling body disclosed and claimed in U.S. Pat. No. 4,834,825, which would couple multiple twenty-foot sections of innerduct end-to-end in order to form a multi-duct configuration for laying the fiber optic cable therethrough. The multiple sections of innerduct placed end to end with a coupling body spaced at twenty foot intervals would be contained within an outer casing of PVC pipe, so as to provide an outer protective layer over the coupled sections of innerduct.

The problems in attempting to utilize the innerduct as claimed in the '442 patent in a multi-cell application are at least two-fold. First, the polyethylene innerduct is of a different molecular structure than the PVC outer casing, and therefore the fluctuations in temperatures under different weather conditions results in the innerduct and the outer casing expanding and contracting in different amounts. Therefore, although the innerduct and the casing ends may be flush when they are placed into position, over a certain period of time, due to changing weather conditions, the innerducts may have expanded to where they protrude out of the outer casing, which is undesirable in the coupling process between another section of casing and innerduct, resulting in damage to the ends of the innerducts.

The second problem is the fact that the innerduct, as claimed in '442 has a high tensile strength outer layer which results in the innerduct being specifically constructed to curve or bend, and sustain loads required to pull the duct into long lengths of outer duct, which is undesirable in a multi-cell setting. It is imperative to have all twenty foot sections of innerduct very rigid so as to form a straight twenty foot multi-cell group of innerducts which can be easily positioned into the outer casing of PVC pipe.

SUMMARY OF THE PRESENT INVENTION

The present invention provides for coextruded innerduct which would include an outer layer of polyethylene, impregnated or filled with a filler material, such as calcium carbonate, talc, microglass beads or strands, or any material which would reduce the expansion and contraction properties of the polyethylene innerduct in relation to the expansion and contraction properties of the outer casing, and an inner layer of standard unfilled polyethylene innerduct which would provide for a smooth surface, to lower the coefficient of friction between itself and the fiber optic cables being pulled therethrough.

In addition, the inner layer of polyethylene material may be filled with a lubricous polymer agent which would further enhance to lower the coefficient of friction between itself and the fiber optic cable. The coextruded innerduct would be utilized specifically in a multi-cell system, due to its properties of rigidity, having little or no tensile strength, and yet its ability to provide the low coefficient of friction necessary to ease the pulling of fiber optic cable therethrough.

Therefore, it is the principal object of the present invention to provide a coextruded innerduct having a highly filled outer layer to provide rigidity, to reduce expansion and contraction of the polyethylene material, and an inner layer of standard unfilled polyethylene material in order to provide a low coefficient of friction between itself and the fiber optic cable being pulled therethrough;

It is a further object of the present invention to provide a coextruded innerduct which has a very low tensile strength, and would be used in substantially twenty foot lengths and coupled end to end via a coupling body in a multi-cell setting;

It is the further object of the present invention to provide a coextruded innerduct which would be highly filled with material such as calcium carbonate, talc, microglass beads or strands in order to reduce the expansion and contraction of the polyethylene material vis a via the expansion and contraction properties of an outer casing of PVC, steel or the like material;

It is the further object of the present invention to provide a coextruded innerduct having a lubricous inner surface for providing a low coefficient of friction for pulling fiber optic cables therethrough, and a highly filled outer surface so that the innerduct can be used in a multi-cell system with substantial nonexistent tensile strength properties; and It is still a further object of the present invention to provide a multi-cell system which would include a plurality of 20-foot lengths of innerduct, coupled together end to end, forming an uninterrupted pathway for fiber optic cable, with the innerduct having an outer filled layer to provide a very low, or non-existent tensile strength, and expansion and contraction properties equivalent to an outer casing of PVC, and an inner layer of standard unfilled polyethylene to allow for a lubricous surface upon which the fiber optic cable travels with ease during installation.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

The system of the present invention utilizing the novel innerduct is illustrated in FIGS. 1-4. This novel innerduct as will be discussed is unlike the basic material utilized in most coextruded innerduct, which is usually of the type generally comprising unfilled innerduct of polyethylene which, in general, is quite pliable, would have a high tensile strength, and under varying weather conditions have a high degree of contraction and expansion while in place. In the context of the present invention, the coextruded innerduct 10 would wish to avoid these properties.

Therefore, innerduct 10 utilized in the present invention would include an outer layer 12 which would be a basic polyethylene material highly filled with additives in order to greatly reduce its properties of contraction and expansion, and similarly to give it a very low tensile strength so that the innerduct 10 is maintained as rigid as possible under all conditions, with substantially reduced expansion and contraction. In fact, this product cannot be pulled, because of the fillers included in the innerduct, and it would pull apart due to the fillers. In reality, the longest length of innerduct that could be pulled having the fill material would be somewhere in the neighborhood of forty feet in length, before it would be subject to breakage.

Figure 2:
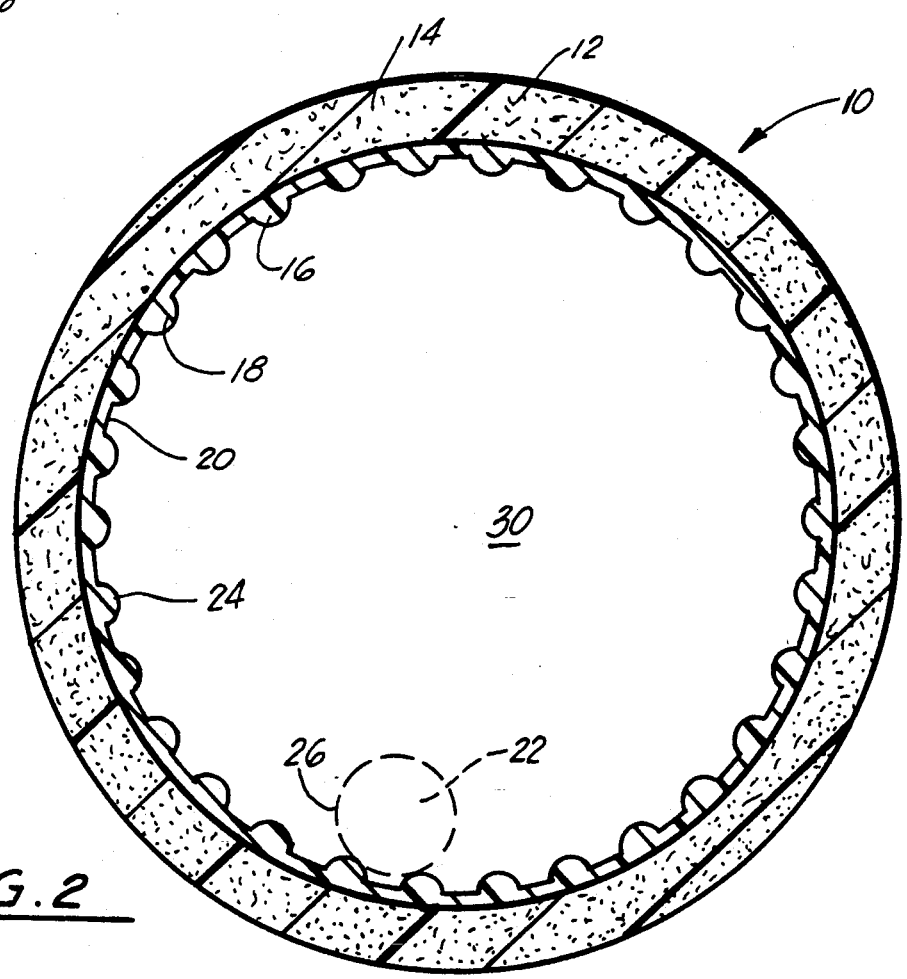
FIG. 2 is a cross-section view of the coextruded innerduct of the present invention.

The filled material in layer 12 which is represented by the shading 14 in cross-section in FIG. 2, would be selected from a group of materials consisting generally of polyethylene calcium carbonate, talc, microglass beads, or microglass strands, or any other filled material which can be produced in a highly powdered or stranded form and which give the qualities of the innerduct 10 as recited earlier.

Figure 1:
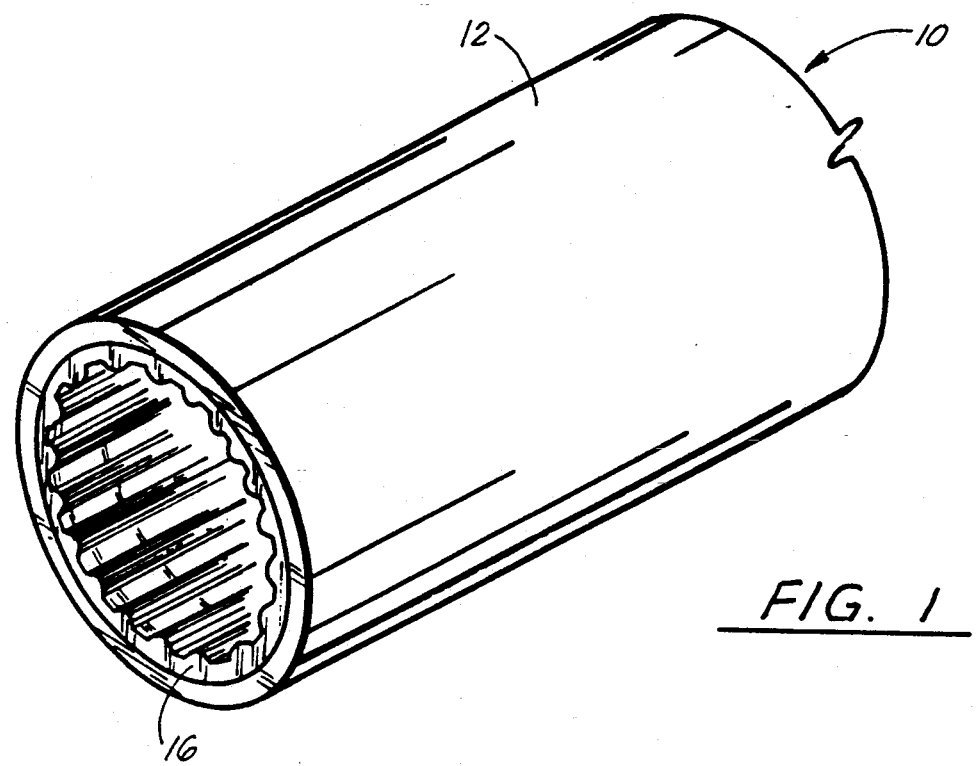
FIG. 1 is an overall partial view of the coextruded innerduct of the present invention.

The highly filled outer layer of innerduct 10 would then be coextruded with an unfilled polyethylene layer 16, which would, as seen in FIGS. 1 and 2, be formed having a plurality of longitudinal raised ridges 18, with gaps 20 therebetween, so that a length of fiber optic cable, as illustrated in phantom view by the numeral 22, would make contact substantially only with the ridge portion 18 of the inner layer 16, and due to the natural lubricity qualities of unfilled polyethylene, would produce a low coefficient of friction between the wall 24 of the unfilled interior polyethylene layer 16, and the wall 26 of the strand of fiber optic cable 22. In the preferred embodiment, the configuration of the raised ridges 18 along the inner wall of the innerduct 10 may be straight, or may have a configuration known in the art as "oscillating ribs". Either configuration of the ridges 18 would contribute greatly in the ease through which the fiber optic cable could be threaded through the bore 30 of the coextruded innerduct 10.

Furthermore, it is foreseen that the inner layer 16 of the unfilled polyethylene innerduct may be filled with a lubricating agent of polymer material selected from a group such as glycol, silicone or the like, which would enhance even greater the lubricating qualities of the polyethylene interior layer, and therefore again would even reduce further the coefficient of friction between the wall of the fiber optic cable 22 and the wall 24 of the inner layer 16 of the coextruded innerduct 10.

Figure 3:
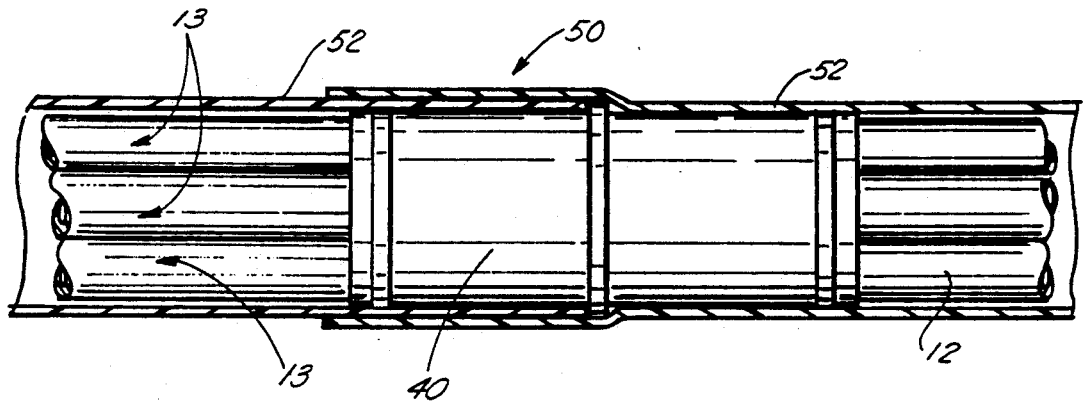
FIG. 3 is a cross-section, side partial view of the innerduct positioned end to end within a coupling body.
Figure 4:
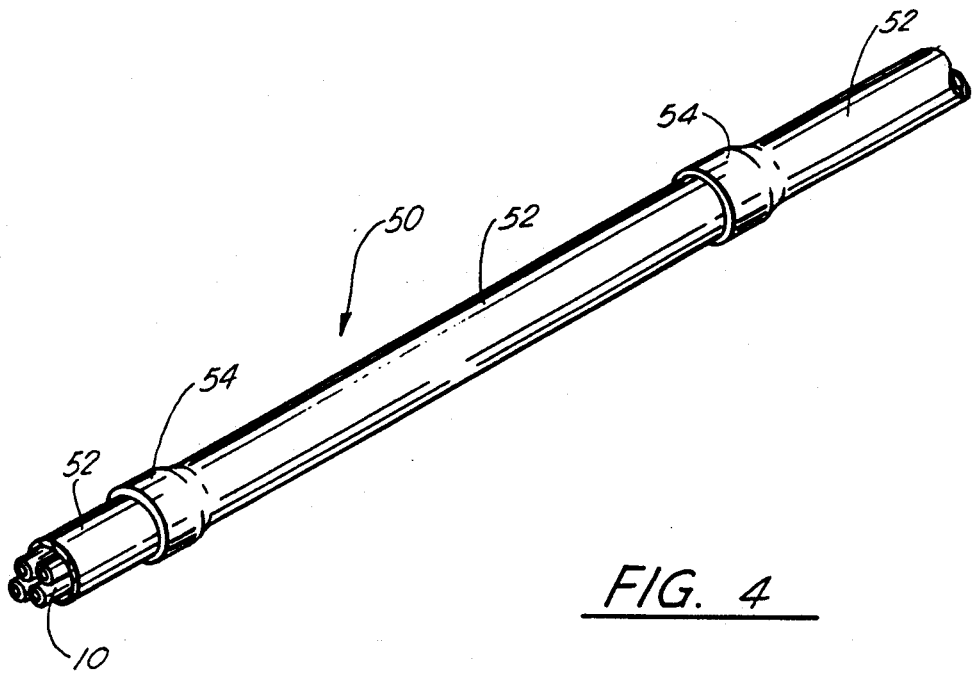
FIG. 4 is an overall view of the sections of the coextruded innerduct utilized in a multi-cell system.

Returning now to the reasons behind the co-extrusion of the outer highly filled layer of polyethylene innerduct 12, and the interior unfilled layer 16 of polyethylene innerduct, reference is made to FIGS. 3 and 4, where there is illustrated in representational view the multi-cell system 50, which would comprise in part a plurality of sections of inner-duct 10 which would be provided in the embodiment as foreseen to be used in the industry, in twenty foot lengths, and would therefore form a unitized twenty-foot section of a multi-celled group of innerducts which could be used in a system to feed a plurality of fiber optic cables therethrough. The twenty foot lengths of innerduct would be coupled via a coupling body 40 which preferably would be of a type coupling body as disclosed and claimed in U.S. Pat. No. 4,834,825, exclusively licensed to Opti-Com Manufacturing Network, Inc., and would provide a fully gasketed means of sealing the interior or ends of the twenty foot lengths of innerduct 10 that would be inserted into coupling body 40 to provide a continuous interior pathway of fiber optic cable 22 through each of the innerducts 10, as seen in FIG. 3

FIG. 4 illustrates this type of coextruded innerduct 10, in a multi-cell system 50. As illustrated, the plurality of innerducts have been positioned within the outer casing 52 of PVC material, in at each ball end 54 of the outer casing 52, there would be provided a coupling body 40 as illustrated in FIG. 3. Because of the nature of the multi-cell system 50, as discussed earlier, it is necessary that the innerducts 10 be very rigid and have a low tensile strength to enable it to be used as a pulled innerduct, since the innerduct 10 must extend between each coupling body 40, in twenty-foot lengths, preferably in a relatively straight and unbending fashion, as illustrated in FIG. 4. A high tensile strength property would enable the innerducts to sag or to bend quite easily which is undesirable in running fiber optic cable 22 therethrough. Furthermore, and perhaps more importantly, is the fact that the outer layer of highly filled innerduct would reduce greatly the expansion and contraction properties of the innerduct 10 which is important when the innerduct 10 is housed within an outer casing 52 of a dissimilar material such as PVC, steel, or fiberglass, all of which have a greatly reduced or nonexistent expansion or contraction property. The highly filled innerduct 10 would therefore achieve the qualities of expansion and contraction equivalent to the outer casing 52, and under differing weathering conditions, expand and contract generally in unison with the outer casing.

Therefore, in the configuration of the innerduct within the outer housing of PVC, steel, or fiberglass, and in the assembling of the system by twenty foot sections, the result would be that the ends of the innerduct housed within the outer casing. This would provide that the innerduct ends would be substantially flush with the outer housing. Therefore, when placed in position into the coupling body with the next twenty foot section, there would be little possibility that one of the innerducts may have expanded or contracted unevenly. This would result in difficulty, if not impossibility, of inner-connecting the next twenty foot section. The fill material utilized as the outer shell of the innerduct would provide for the nonexistent or great reduction in the expansion and contraction of the innerduct. The highly filled outer layer would then provide a means for insuring that the ends of the innerduct and the ends of the outer PVC, steel, or fiberglass casing are flush. This would greatly enhance the coupling of various sections into a continuous passage way for the fiber optic cable that will be fed therethrough.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An innerduct system for housing a fiber optic cable therethrough, said innerduct system comprising:
   a) an innerduct, which includes:
      i. a first polyethylene material layer, said layer highly filled with a compound for providing a low expansion and contraction qualities, and for establishing rigidity in the outer layer; and
      ii. a second inner layer of non filled polyethylene material for providing a lubricated inner surface which has a low coefficient of friction to provide for the placement of a fiber optic cable therethrough; and
   b) an inflexible outer housing of rigid material selected from the group consisting of PVC, steel or fiberglass, so as to provide equivalent low expansion and contraction qualities which are found in the innerduct so that both the innerduct and the outer casing expand and contract at substantially equal rates.

2. The innerduct system in claim 1, further comprising an outer protective casing of PVC, steel or fiberglass, for housing multiple sections of innerduct so that the sections of the innerduct and the outer housing have relatively similar properties of tinsel strength, and contraction and expansion under varying temperatures.

3. The innerduct in claim 1, wherein the innerduct comprises coextruded innerduct.

4. The innerduct in claim 1, wherein the unfilled inner layer may further comprise a highly lubricous polymeric material from a group consisting of teflon, silicone, or graphite.

5. The innerduct in claim 1, wherein said compound filled into the outer polyethylene layer is chosen from the group consisting of calcium carbonate, talc, microglass beads, or microglass strands or some other similar material to reduce the tinsel strength of the outer layer.

6. The innerduct in claim 1, wherein at least the inner surface of the interior layer of non-filled polyethylene would further comprise a plurality of longitudinally extending ribs at least along a portion of the length of said innerduct.

7. The system in claim 6, wherein the ribs along a portion of the innerduct may be in the configuration of an oscillating pattern.

8. The system in claim 1, wherein the innerduct would be formed in substantially twenty foot lengths, in a multi-cell configuration with at least a coupling body interconnecting a length of innerduct with a second twenty foot length of a multi-section of innerduct.

9. The system in claim 8, wherein the twenty foot sections of innerduct interconnected would provide a substantially clear, unobstructed passageway for fiber optic cable through the bores in the innerduct without flexing of the innerduct in the constructed system.

10. In a system for housing fiber optic cable in a plurality of innerducts, the system comprises:
    a) an inflexible outer housing of rigid material selected from the group consisting of PVC, steel or fiberglass;
    b) a plurality of rigid innerducts each being of a length not to exceed forty feet, each of the innerducts having expansion and contraction qualities substantially equal to the outer casing, the innerducts formed of a coextruded material of an outer layer of highly filled polyethylene, and an unfilled interior layer of polyethylene, the highly filled layer providing a means to reduce the tensile strength and contraction and expansion qualities of the polyethylene, and the inner layer of material serving as a means to provide an inherently high lubricated surface upon which the fiber optic cable may be fed therethrough; and c) means provided on at least one end of the plurality of innerducts for coupling that end of the innerduct to a second section of innerduct to form a continuous multi-duct system.

11. An innerduct system for housing a fiber optic cable therethrough, said innerduct system including an innerduct being of a length not to exceed forty feet, said innerduct which comprises:

a) a first polyethylene material layer, said layer highly filled with a compound for providing low expansion and contraction qualities, and for establishing 16 rigidity in the innerduct; and b) a second inner layer of non-filled polyethylene material for providing a lubricated inner surface which has a low coefficient of friction to provide for the placement of a fiber optic cable therethrough; and c) a lubricating compound included in the inner layer to provide a means to add lubricity to the inner layer, said compound selected from a group consisting of teflon, graphite, silicone of some other polymeric material.

12. The innerduct system in claim 11, further comprising an outer protective casing of PVC, steel or fiberglass, for housing multiple sections of innerduct so that the sections of the innerduct and the outer housing have relatively similar properties of tinsel strength, and contraction and expansion under varying temperatures.

13. The innerduct in claim 11, wherein the innerduct comprises coextruded innerduct.

14. The innerduct in claim 11, wherein said compound filled into the outer polyethylene layer is chosen from the group consisting of calcium carbonate, talc, microglass beads, or microglass strands or some other similar material to reduce the tinsel strength of the outer layer.

15. The innerduct in claim ii, wherein at least the inner surface of the interior layer of non-filled polyethylene would further comprise a plurality of longitudinally extending ribs at least along a portion of the length of said innerduct.

16. The system in claim ii, wherein the innerduct would be formed in substantially twenty foot lengths, in 18 a multi-cell configuration with at least a coupling body interconnecting a length of innerduct with a second twenty foot length of a multi-section of innerduct.

17. The system in claim 16, wherein the twenty foot sections of innerduct interconnected would provide a substantially clear, unobstructed passageway for fiber optic cable through the bores in the innerduct without flexing of the innerduct in the constructed system.

* * * * *